(12) United States Patent
Miller

(10) Patent No.: US 7,822,318 B2
(45) Date of Patent: Oct. 26, 2010

(54) SMART RANDOM MEDIA OBJECT PLAYBACK

(75) Inventor: Douglas Miller, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1218 days.

(21) Appl. No.: 11/380,222

(22) Filed: Apr. 26, 2006

(65) Prior Publication Data
US 2007/0255752 A1 Nov. 1, 2007

(51) Int. Cl.
*H04N 5/91* (2006.01)
*H04N 5/50* (2006.01)
*H04N 5/222* (2006.01)
*H04N 5/445* (2006.01)
*H04N 7/12* (2006.01)
*G06F 17/20* (2006.01)
*G06F 17/21* (2006.01)
*G06F 17/28* (2006.01)
*G11B 21/08* (2006.01)

(52) U.S. Cl. ............... 386/69; 704/1; 704/2; 704/3; 704/4; 704/10; 348/563; 348/564; 348/569; 348/722; 369/30.09; 375/240.26; 375/240.28; 725/39; 725/49; 725/59

(58) Field of Classification Search .......... 704/104.1, 704/1, 2, 3, 4, 10, 103 R, E17.009, E17.022, 704/E17.023; 348/563, 564, 569, 722, E5.105; 369/30.09; 375/240.26, 240.28; 386/69; 725/39, 49, 59; G9B/19.002, 27.012, 27.018, G9B/27.019, 27.05, 27.051
See application file for complete search history.

(56) References Cited

U.S. PATENT DOCUMENTS 6,483,548 B1 * 11/2002 Allport ................. 348/564

(Continued)

FOREIGN PATENT DOCUMENTS

EP  0 480 268 A2  4/1992

(Continued)

OTHER PUBLICATIONS

International Search Report for corresponding Application No. PCT/US2006/041819 dated Feb. 6, 2007.

(Continued)

*Primary Examiner*—Thai Tran
*Assistant Examiner*—Syed Y Hasan
(74) *Attorney, Agent, or Firm*—Renner, Otto, Boisselle & Sklar, LLP

(57) ABSTRACT

An electronic equipment is provided that includes a playlist with a plurality of media objects, each associated with a ranking from a hierarchy of rankings, ranging from a highest ranking to a lowest ranking. The electronic equipment includes a media player section configured to play the plurality of media objects. The media player section has a random play function, which is operable to randomly access media objects associated with the highest ranking for play by the media player section. The media player section also includes a tracking function to lower the ranking associated with the randomly accessed media objects from the highest ranking to a lower ranking. If there are no media objects associated with the highest ranking, the tracking function is operable to raise the ranking associated with each of the plurality of the media objects until at least one media object is associated with the highest ranking.

31 Claims, 4 Drawing Sheets

U.S. PATENT DOCUMENTS

| | | | |
|---|---|---|---|
| 6,895,407 B2 * | 5/2005 | Romer et al. | 707/104.1 |
| 2004/0131333 A1 | 7/2004 | Fung et al. | |
| 2004/0223417 A1 * | 11/2004 | Bardsley et al. | 369/30.09 |
| 2005/0195696 A1 | 9/2005 | Rekimoto | |

FOREIGN PATENT DOCUMENTS

| | | |
|---|---|---|
| EP | 1 420 388 A1 | 5/2004 |
| GB | 2 401 477 | 11/2004 |
| WO | 2005/046252 A2 | 5/2005 |

OTHER PUBLICATIONS

International Preliminary Report on Patentability for corresponding International Application No. PCT/US2006/41819, filed Oct. 25, 2006.

* cited by examiner

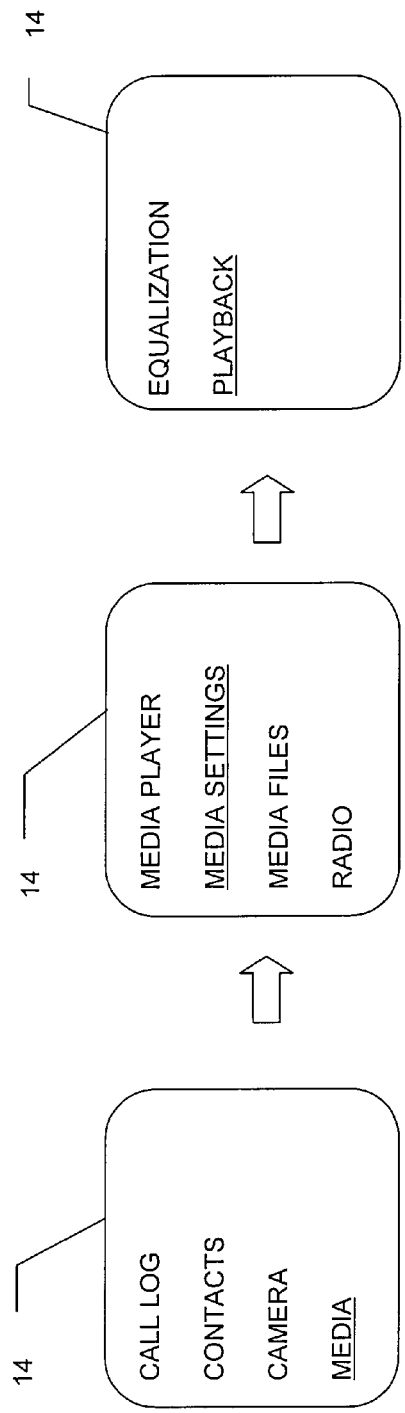
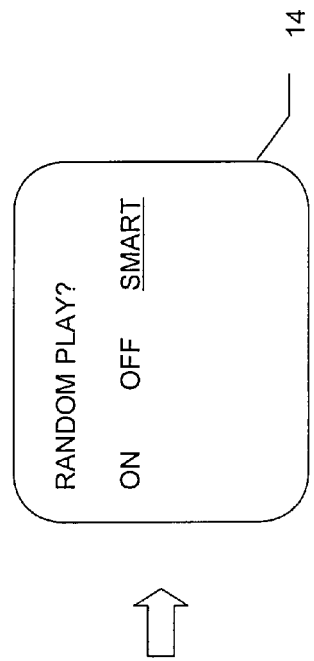
FIG. 3A  FIG. 3B  FIG. 3C  FIG. 3D

SMART RANDOM MEDIA OBJECT PLAYBACK

TECHNICAL FIELD OF THE INVENTION

The present invention relates generally to electronic equipment, and more particularly to electronic equipment with random operation such as media playback in random mode.

DESCRIPTION OF THE RELATED ART

The shuffle or random feature is a well known function of media playback equipment wherein the order in which media objects (e.g., video or audio tracks) on a prerecorded media are played back is randomized. The shuffle feature can add variety and unpredictability to a listening experience.

Playlists are also a well known feature of media playback equipment. Playlists define a group of media objects (e.g., songs, videos, still pictures, etc.) set forth in some predetermined order for play by the media playback equipment. Media playback equipment refer to a selected playlist to determine which particular media objects are to be played. Playlists can be created by a user, generated automatically, downloaded by the user, etc., or various combinations thereof. The playlists may include only a subset of all the media objects stored in the media playback equipment (commonly referred to as the "media library"), or may include all of the media objects within the media library. In the absence of a preselected playlist, media playback equipment typically reverts to a default playlist including all of the media objects within the media library in the order in which the media objects are stored in memory of the media playback equipment.

Playlists are useful in that they provide users with more control over the particular media objects which are played during a session. Sometimes it is content of the playlist that a user is particularly interested in (e.g., all classic rock songs within a media library), with less importance on the particular order in which the media objects within the playlist are played. At other times, a user may be more interested in maintaining the order of playback of the media objects within a given playlist. For example, a user may prefer to listen to the songs from a "story album" such as Pink Floyd's "The Wall" in their original order.

Depending on the user's mood, feelings, etc., there will be times when a user desires that the media playback equipment play back the media objects in a playlist in the order in which they are listed. On the other hand, there will be times when a user may desire "random" playback mode in which the media objects in the playlist are played back in randomized order.

Conventional media playback equipment allows a user to utilize random mode to randomly select media objects from a playlist for play. Typically, the random mode of conventional media playback equipment does not track the media objects that it randomly accesses. Instead, conventional media playback equipment randomly selects a media object for play from the entire playlist. After the media object is played, the device then randomly selects another media object from the playlist without tracking which media objects have been played or which objects have been skipped by the user. Other conventional media playback equipment randomize the media objects in a playlist and then play the media objects in the randomized order, again, without tracking which media objects have been played.

Other times, a user may desire randomized playback of media objects where the media objects that the user prefers are played more often than those media objects that the user does not prefer. Conventional media playback equipment is incapable of tracking which media objects are preferred so that they are played more frequently than those media objects that are not preferred.

In view of the aforementioned shortcomings associated with random mode playback in conventional media playback equipment, there is a strong need in the art for random media playback which better provides random playback of media files while avoiding certain media objects being played with a greater frequency than other media objects and to randomly play and track media objects according to predefined criteria so that the media objects that the user prefers are played more often than the media objects that the user does not prefer.

SUMMARY

According to the present invention, an electronic equipment is provided. The electronic equipment includes a playlist with a plurality of media objects, each associated with a ranking from a hierarchy of rankings, wherein the hierarchy of rankings comprises a highest ranking and at least one lower ranking and a media player section configured to play the plurality of media objects, the media player section having a random play function operable to randomly access media objects associated with the highest ranking from the playlist in order to be played by the media player section and a tracking function to lower the ranking associated with the randomly accessed media objects from the highest ranking to a lower ranking after the media objects have been randomly accessed, and for raising the ranking associated with each of the plurality of the media objects until at least one media object is associated with the highest ranking in the event that each of the plurality of media objects is associated with a lower ranking.

In accordance with one aspect, the at least one lower ranking comprises an intermediate ranking and a lowest ranking, wherein the intermediate ranking is between the highest ranking and the lowest ranking.

According to another aspect, the tracking function changes the ranking associated with the randomly accessed media objects to the intermediate ranking after the media object has been accessed by the random play function.

According to yet another aspect, the tracking function changes the ranking associated with the randomly accessed media objects to the lowest ranking in the event that the media player plays less than half of the media object.

According to yet another aspect, the electronic equipment includes a manual selection function to manually access media objects from the playlist in order to be played by the media player.

In accordance with still another aspect, the tracking function changes the ranking associated with the manually accessed media objects to the intermediate ranking after the media objects have been accessed by the manual selection section.

According to another aspect, the least one lower ranking comprises a plurality of intermediate rankings and a lowest ranking, wherein the plurality of intermediate rankings is between the highest ranking and the lowest ranking.

With yet another aspect, the plurality of intermediate rankings includes a first intermediate ranking and a second intermediate ranking, wherein the first intermediate ranking is higher than the second intermediate ranking and the second intermediate ranking is higher than the lowest ranking.

In accordance with another aspect, the electronic equipment includes a manual selection function to manually access media objects from the playlist in order to be played by the media player section.

According to yet another aspect, the tracking function changes the ranking associated with the manually accessed media objects to the first intermediate ranking after the media objects have been manually accessed by the manual selection section.

According to another aspect, the tracking function changes the ranking associated with randomly accessed media objects to the second intermediate ranking in the event that the media objects have been accessed by the random play function for play by the media player.

According to still another aspect, the tracking function changes the ranking associated with the randomly accessed media objects to the lowest ranking in the event that the media player plays less than half of the media object.

In accordance with still another aspect, the electronic equipment further includes a manual selection function to manually access media objects from the playlist in order to be played by the media player section and wherein the tracking function changes the ranking associated with the manually accessed media objects to the first intermediate ranking after the media objects have been manually accessed by the manual selection section.

According to another aspect, the plurality of intermediate rankings further comprises a third intermediate ranking between the first intermediate ranking and the second intermediate ranking and a fourth intermediate ranking between the second intermediate ranking and the lowest intermediate ranking.

According to yet another aspect, the plurality of intermediate rankings further comprises a plurality of additional rankings between the first intermediate ranking and the second intermediate ranking and a plurality of additional rankings between the second intermediate ranking and the lowest intermediate ranking.

In accordance with another aspect, the media objects comprise at least audio files.

In accordance with still another aspect, the media objects comprise at least video files.

In accordance with yet and another aspect, the media objects comprise at least image files.

According to yet another aspect, the electronic equipment is a mobile phone.

According to still another aspect, the electronic equipment is a personal entertainment device.

In accordance with yet another aspect, at least one of the playlist or media objects is located remote from the electronic equipment.

In still another aspect of the invention, a method of playing media objects on an electronic equipment includes: accessing a plurality of media objects in a media file, each associated with a ranking from a hierarchy of rankings, wherein the hierarchy of rankings comprising a highest ranking and at least one lower ranking; randomly accessing and playing media objects associated with the highest ranking from among the plurality of media objects in order to be played; changing the ranking associated with the randomly accessed media objects from the highest ranking to a lower ranking; and increasing the ranking associated with each of the plurality of media objects in the event that each of the plurality of media objects is associated with a lower ranking until at least one media object is associated with the highest ranking.

According to another aspect, at least one lower ranking comprises at least one intermediate ranking and a lowest ranking.

According to another aspect, the ranking associated with the media objects is changed from the highest ranking to the intermediate ranking in the event that the media objects have been played.

In accordance with still another aspect, the ranking associated with the media objects from the intermediate ranking to the lowest ranking in the event that less than half of the media object is played.

In still another aspect, the method includes the step of manually selecting media objects to be played from among the plurality of media objects in the playlist and changing the ranking associated with the manually selected media objects to the intermediate ranking after the manually selected media object is accessed.

In another aspect, at least one intermediate ranking comprises a first intermediate ranking and a second intermediate ranking, wherein the first intermediate ranking is between the highest ranking and the second intermediate ranking and the second intermediate ranking in between the first intermediate ranking and the lowest ranking.

In still another aspect, the ranking associated with the media objects is changed to the second intermediate ranking in the event that the media objects are randomly accessed and played.

In accordance with yet another aspect, the ranking associated with the media objects is changed to the lowest ranking in the event that less than half of the randomly accessed media object is played.

In accordance with still anther aspect, the method further includes the step of manually selecting a media object from among the plurality of media objects in order to be played, wherein the ranking associated with the manually selected media object is changed to the first intermediate ranking after the media object is manually accessed.

In still another aspect of the invention, a program stored on a machine readable medium is provided. The program, when executed by a machine, provides for reproducing media objects in an electronic equipment by providing a playlist, the content of which identifies a plurality of media objects associated with a ranking from a plurality of rankings, wherein the plurality of rankings includes a highest ranking and at least one lower ranking, randomly accessing and playing the media objects associated with the highest ranking, changing the ranking associated with the media objects to a lower ranking after the media objects has been played, and increasing the ranking associated with each of the plurality of media objects in the event that none of the media objects are associated with the highest ranking.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof, etc.

BRIEF DESCRIPTION OF THE DRAWINGS

FIGS. 3A, 3B, 3C and 3D illustrate exemplary graphical user interface screen displays on the exemplary electronic equipment of FIG. 1.

DETAILED DESCRIPTION OF EMBODIMENTS

Figure 1:
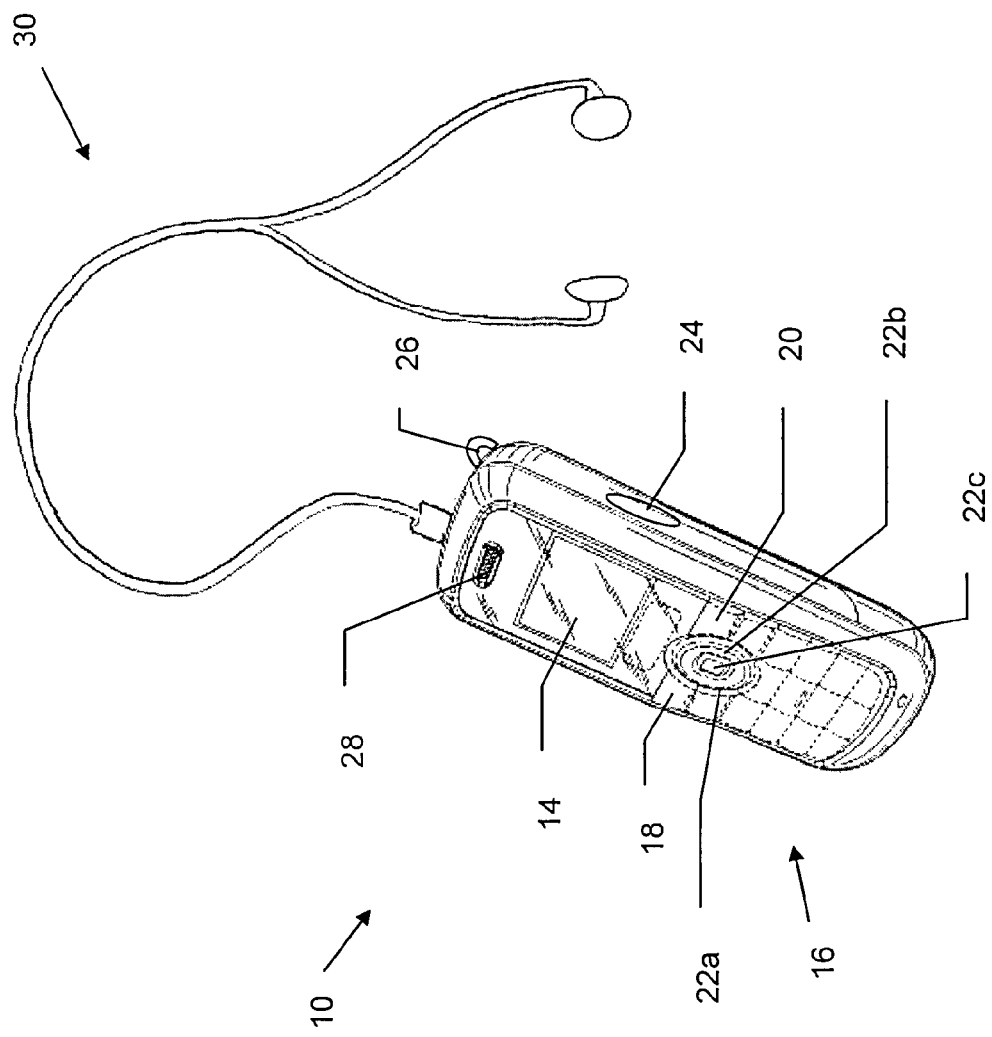
FIG. 1 is a schematic view of a mobile phone representing an exemplary electronic equipment.

The present invention will now be described with reference to the drawings, wherein like reference numerals are used to refer to like elements throughout.

The term "electronic equipment" as referred to herein includes personal portable electronics, including, but not limited to, media players of various formats such as digital music players (e.g., CD, MP3, AC-3, .wma, etc.), video players (e.g., DVD, MPEG, .wmv, etc.), picture players (e.g., JPEG, etc.), etc. Electronic equipment includes traditional media players such as CD and DVD players, as well as the increasingly popular "flash memory" and "hard drive" type media players, referring to the type of memory used to store various media files. Electronic equipment includes dedicated media players as well as multi-functional devices that include media players. Such multi-functional devices include portable radio communication equipment. The term "portable radio communication equipment," also referred to herein as a "mobile radio terminal," includes all equipment such as mobile phones, pagers, communicators, e.g., electronic organizers, personal digital assistants (PDAs), smartphones and the like.

In the present application, the invention is described primarily in the context of a mobile phone. However, it will be appreciated that the invention is not intended to be limited to a mobile phone and can be any type of electronic equipment. Moreover, although the invention is described primarily in the context of randomly playing media objects in a media player, it will be appreciated that the invention more generally has application in the randomly playing, executing, etc. of any types of lists or collections as will also be discussed herein.

For reasons that will be explained more fully below, the mobile phone 10 overcomes the aforementioned shortcomings associated with existing electronic equipment that offer media playback.

In one embodiment of the present invention, a tracking function ranks all of the media objects in a playlist with a first identifier. After a media object is randomly played by the media player, the tracking function changes the identifier associated with the media object to a second identifier. The media player continues to play media objects with the first identifier randomly until there are no more media objects associated with the first identifier. The tracking function then changes the identifier associated with each media file back to the first identifier, and the media object player resumes randomly playing the media objects with the first identifier.

In another embodiment of the present invention, the media objects are grouped or associated with one of several different rankings, including a highest ranking and a lowest ranking. The rankings also may include a plurality of intermediate or lower rankings. A random play function randomly selects a media object from the group of media objects with the highest ranking for play by the media player. Depending on certain user input or lack of user input, set forth in more detail below, a tracking function changes the ranking of the selected media object to a lower ranking or the lowest ranking according to some predefined criteria. If there are no media objects with a highest ranking, the tracking function increases the ranking of all of the media objects until at least one media object has the highest ranking. The random play function of the media player then continues to randomly select the media objects with the highest ranking for play by the media player, and the tracking function continues to subsequently reduce the ranking of the selected media objects until all media objects have a lower ranking. At which point, the tracking function increases the rankings of each of the plurality of media objects according to some predefined criteria until at least one of the media objects has the highest ranking. At any point during the media playback, the user optionally may manually access a media object for play. After being played, the tracking function changes the ranking associated with the media object to a lower ranking, and, if the user does not manually select another media object, the random play function and media player will continue playing random media objects associated with the highest ranking.

Referring initially to FIG. 1, an electronic equipment is shown in accordance with one embodiment of the present invention. In the exemplary embodiment described herein, the electronic equipment is a mobile phone 10. The mobile phone 10 is shown as having a "brick" or "block" design type housing, but it will be appreciated that other type housings such as clamshell or slide-type housings may be utilized without departing from the scope of the invention.

The mobile phone 10 includes a display 14 and keypad 16. As is conventional, the display 14 displays information to a user such as operating state, time, phone numbers, contact information, various navigational menus, etc., which enable the user to utilize the various features of the mobile phone 10. Similarly, the keypad 16 may be conventional in that it provides for a variety of user input operations. For example, the keypad 16 typically includes alphanumeric keys for allowing entry of alphanumeric information such as telephone numbers, phone lists, contact information, notes, text messages, etc. In addition, the keypad 16 typically includes special function keys such as a "call send" key 18 for initiating or answering a call, and a "call end" key 20 for ending, or "hanging up" a call. Special function keys also may include menu navigation keys 22a, 22b and 22c, for example, for navigating through a menu displayed on the display 14, to select different phone functions, profiles, settings, etc., as is conventional. Other keys included in the keypad 16 may include a volume key 24, on/off power key 26, as well as various other keys such as a web browser launch key, camera key, etc.

In the particular embodiment of FIG. 1, the mobile phone 10 includes the display 14 and separate keypad 16. In an alternative embodiment, the display 14 may comprise a touch screen which itself includes one or more keys. In yet another embodiment, the display 14 may comprise a touch screen that includes all or substantially all of the keys used to operate the phone 10 so as to include a very limited keypad 16 or no keypad 16 at all. As will be appreciated, the particular form and function of the keys included in the keypad 16 or touch screen/display 14 are not germane to the invention in its broadest sense.

As will be described in more detail below, the mobile phone 10 is a multi-functional device that is capable of carrying out various functions in addition to traditional mobile phone functions. For example, the mobile phone 10 in accordance with the present invention also functions as a media player. More specifically, the mobile phone 10 is capable of playing different types of media objects such as, for example, audio files (e.g., MP3, .wma, AC-3), video files (e.g., MPEG, .wmv, etc.), still images (e.g., .pdf, JPEG, .bmp, etc.). The media objects are typically stored in non-volatile memory within the mobile phone 10. The mobile phone 10 reproduces audio files through a speaker 28 or an accessory such as stereo headphones 30 which may be plugged into the mobile phone 10 via an appropriate connector. The mobile phone 10 is capable of reproducing video or other image files on the display 14, for example.

Figure 2:
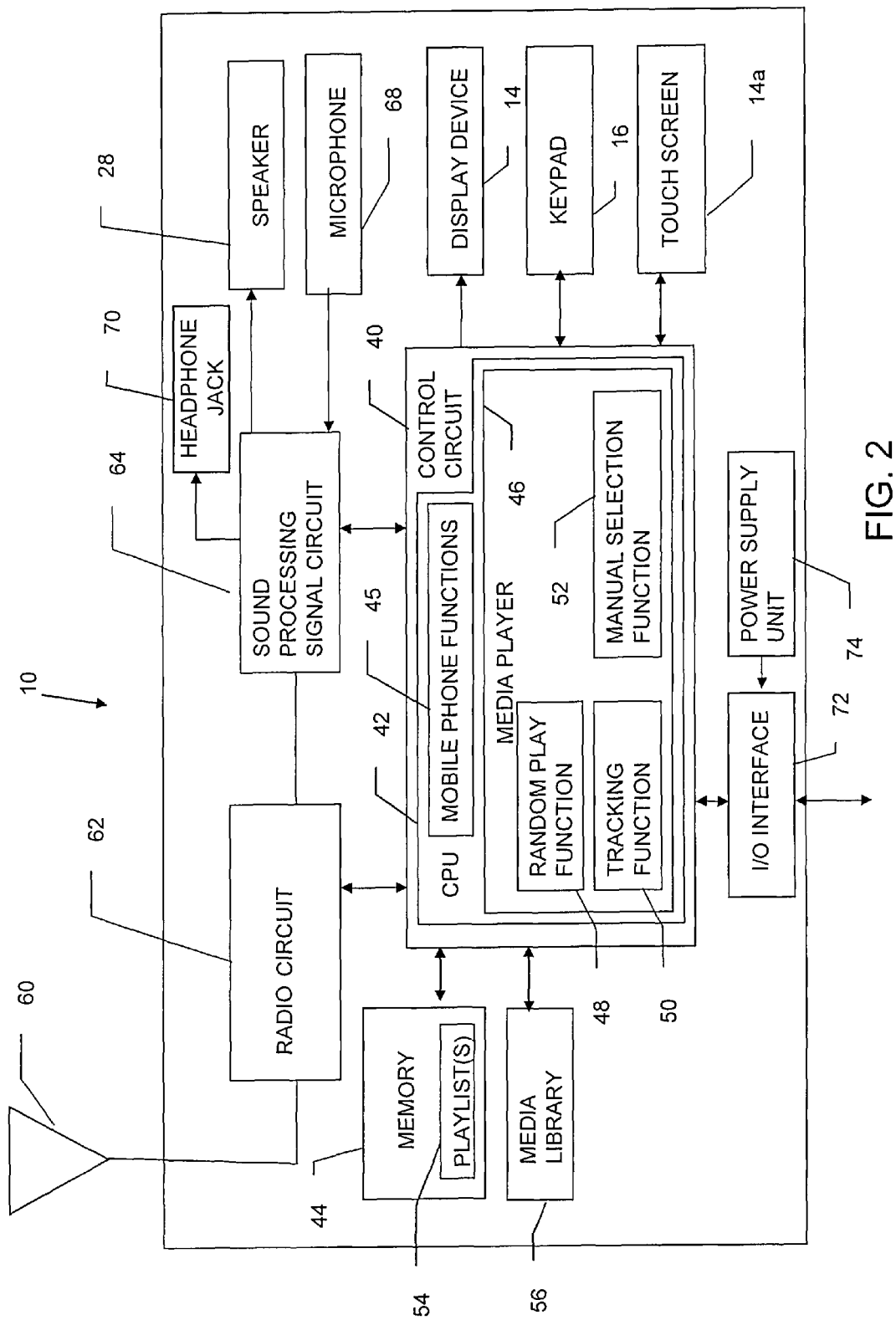
FIG. 2 is a schematic block diagram of the relevant portions of the exemplary electronic equipment of FIG. 1.

FIG. 2 represents a functional block diagram an exemplary electronic equipment of the FIG. 1. The construction of the mobile phone 10 is generally conventional with the exception of random mode operation as described herein. Preferably, random mode operation is implemented primarily via application software within the mobile phone 10. However, it will be apparent to those having ordinary skill in the art that such operation can be carried out via primarily software, hardware, firmware, or combinations thereof, without departing from the scope of the invention.

The mobile phone 10 includes a primary control circuit 40 that is configured to carry out overall control of the functions and operations of the mobile phone 10. The control circuit 40 may include a CPU, microcontroller, or microprocessor, etc., collectively referred to herein simply as a CPU 42. The CPU 42 executes code stored in memory within the control circuit 40 (not shown) and/or in a separate memory 44 in order to carry out conventional operation of the mobile phone functions 45 within the mobile phone 10. In addition, however, the CPU 42 executes code stored in the memory 44 in order to perform a media player function with a media player 46, which includes a random play function 48, a tracking function 50, and also may include a manual selection function 52. The memory 44 also may be capable of storing the rankings associated with the media objects, both during operation of the mobile phone 10 and while the mobile phone 10 or media player 46 are not in use.

The memory 44 may include one or more playlists 54 created by the user or otherwise provided within the mobile phone 10. A playlist 54 identifies a list of media objects that the mobile phone 10 is to reproduce during playback. The media objects appear in the playlist 54 in the order in which the media objects are intended to be reproduced normally (i.e., in the absence of a random operation). The user may generate the playlists, or the user may download the playlist. Alternatively, the mobile phone 10 may generate the playlist (e.g., based on a user input such as genre, artist, year of release, etc.), etc. In yet another alternative, playlist(s) may reside on remote storage, e.g., on a remote server accessible by the mobile phone 10 via a wireless internet connection. The particular manner in which the playlists are generated is not germane to the claimed invention, as will be appreciated.

The mobile phone 10 further includes a media library 56 in accordance with the preferred embodiment. The media library 56 represents a storage medium that stores various media objects in the form of audio files, video files, picture/image files, etc. The storage medium preferably is a non-volatile memory such as a large capacity flash memory or micro-hard drive, each of which is well known in personal media players. In a more limited context, the media library 56 may be represented by a relatively small capacity compact disk (CD), mini-disk, flash card, etc., each of which may be inserted into the electronic equipment for reproduction of the media objects thereon. Alternatively, the media library 56 may also reside on remote storage, for example, on a remote server also accessible by the mobile phone 10 via a wireless internet connection. The playlist(s) 54 each identify a list of media objects that are stored in the media library 56 and/or are accessible on remote storage. Typically a playlist will include only a subset of the media objects in the media library 56 or remote storage, although a playlist could include all of the media objects in the media library 56 or remote storage.

In accordance with conventional media player operation, the user will select a playlist 54 from among those in the memory 44 via a user interface typically in combination with the display 14. Alternatively, the user may request that the media player 46 create a playlist 54 automatically (e.g., based on genre, artist, year of release, etc.). As yet another alternative, the media player 46 will revert to a default playlist 54 in the absence of a specified selection by the user. For example, the default playlist 54 may consist of all of the media objects in the media library 56, or may result from the order in which media objects are stored in the media library 56. For example, the media player 46 may revert to a default playlist where it plays the media objects stored in the media library 56 beginning at a starting address and sequentially therethrough to an ending address.

A person having ordinary skill in the art of computer programming and specifically in applications programming for mobile phones and media players will consider it obvious, in view of the description provided herein, how to program a mobile phone 10 or other electronic equipment to operate and carry out the functions described herein. Accordingly, details as to the specific programming code have been left out for sake of brevity. Also, while the media player 46, the random play function 48 and the tracking function 50 are carried out via the CPU 42 and application software in the memory 44 in accordance with the preferred embodiment, such functions could also be carried out via dedicated hardware, firmware, software, or combinations thereof.

A user may initiate the media player 46 via one or more keys on the mobile phone 10. Upon initiating playback, the media player 46 looks to the selected (or default) playlist 54, which may have a plurality of media objects associated with one or more rankings, including a highest ranking. The random play function 48 randomly selects a media object from a group of media objects in the playlist 54 associated with the highest ranking. Thereafter, the media player 46 proceeds to reproduce the media object via the speaker 28/headset 30 and/or display 14. More particularly, the media player 46 accesses the media object from the media library 56 or playlist 54, and converts the digital data to an audio and/or video signal presented to the speaker 28/headset 30 and/or display 14. The tracking function 50 changes the ranking associated with the media object after it is accessed by the random play function 48. Upon completing the reproduction of the media object, or when prompted by the user, by for example, using the navigational keys 22a, 22b, 22c on the keypad 16, the random play function 48 randomly selects another media object associated with the highest ranking for play. The media player 46 proceeds to reproduce the next randomly selected media object in the same manner. This process continues until the media player 46 reproduces the last media object in the playlist 54 associated with the highest ranking, at which point, the tracking function 50 changes the ranking associated with each media object of the plurality of media objects until at least one of the media objects has the highest ranking.

Continuing to refer to FIG. 2, the mobile phone 10 includes an antenna 60 coupled to a radio circuit 62. The radio circuit 62 includes a radio frequency transmitter and receiver for transmitting and receiving signals via the antenna 60 as is conventional. The mobile phone 10 further includes a sound processing circuit 64 for processing the audio signal transmitted by/received from the radio circuit 62. In addition, the sound processing circuit 64 serves to process the audio signal provided by the control circuit 40 during playback of media objects. Coupled to the sound processing circuit 64 are the aforementioned speaker 28, and a microphone 68 which enable a user to listen and speak via the mobile phone 10, as is conventional. In addition, a headphone jack 70 coupled to the sound processing circuit 64 is provided. This allows the headset 30 to be connected to the mobile phone 10. Thus, when functioning as a media player 46 the mobile phone 10 may direct audio to the speaker 28 and/or the headset 30 via the sound signal processing circuit 64. The radio circuit 62 and sound processing circuit 64 are each coupled to the control circuit 40 so as to carry out overall operation.

The mobile phone 10 also includes the aforementioned display 14 and keypad 16 coupled to the control circuit 40. In the case where all or part of the display 14 comprises a touch screen, such operation may be represented by the touch screen 14a in FIG. 2. The mobile phone 10 further includes an I/O interface 72. The I/O interface 72 may be in the form of any one of many typical mobile phone I/O interfaces, such as a multi-element connector at the base of the mobile phone 10. As is typical, the I/O interface 72 may be used to couple the mobile phone 10 to a battery charger to charge a power supply unit 74 within the mobile phone 10. In addition, or in the alternative, the I/O interface 72 may serve to connect the mobile phone 10 to a wired personal hands-free adaptor (not shown) or Bluetooth adaptor (also not shown) for use with a Bluetooth-based hands-free adaptor. Further, the I/O interface 72 may serve to connect the mobile phone 10 to a personal computer or other device via a data cable, etc. As another alternative, the I/O interface 72 may serve to connect the mobile phone 10 to a docking station including an audio amplifier, speakers and/or video display to allow for enhanced viewing/listening of the media objects as part of the media player 46.

Turning now to FIGS. 3A-3D, exemplary screen displays are shown illustrating a manner in which a user may initiate the random play. Using the navigation keys 22a, 22b, 22c on the keypad 16, for example, the user may call up a main menu on the display 14 as shown in FIG. 3A. By manipulating the navigation keys, the user may select "Media" leading to the sub-menu shown in FIG. 3B. Again, by manipulating the navigation keys 22a, 22b, 22c the user may then select "Media Settings" resulting in the sub-menu shown in FIG. 3C. By selecting "Playback" in the menu of FIG. 3C, the user may thereby initiate random play features as described herein. Specifically, the user may select in the menu of FIG. 3D whether the random play function is "On," "Off," or "Smart" to control how the mobile phone 10 functions with respect to media playback as will now be described in detail below. If the user selects "On," conventional random media playback is initiated.

In one embodiment of "Smart" random mode, the rankings associated with the media objects include a first and a second identifier. The random play function 48 is operable to randomly access a media object associated with the first identifier from the group of media objects associated with the first identifier. After the media objects are accessed by the random play function 48, the tracking function 50 operates to change the first identifier to the second identifier. The random play function 48 continues to randomly access media objects associated with the first identifier as long as there are media objects associated with the first identifier in the playlist 54. Once all of the media objects associated with the first identifier have been accessed, the tracking function 50 changes the identifier associated with each of the plurality of media objects back to the first identifier. The random play function 48 then continues to access random media objects associated with the first identifier. It will be appreciated that at any time during media playback, the user may manually select a media object for play by utilizing the manual selection function 52.

In another embodiment of "Smart" random mode, the media objects are associated with a hierarchy of rankings, which may include one intermediate ranking or a plurality of intermediate rankings. When functioning in "Smart" mode, the media objects with higher rankings will tend to be accessed and played by the media player 46 more often than those media objects that are associated with lower rankings. This is because the ranking associated with the media objects is increased by one ranking each time there are no media objects with the highest ranking. For example, if a hierarchy of four rankings is used, those media objects that become associated with the lowest ranking require three iterations or ranking increases before they are associated with the highest ranking. Media objects that become associated with the second highest ranking, however, only require one iteration or ranking increase before they are associated with the highest ranking. Therefore, the media object whose association is changed to the second highest ranking are eligible for random selection three times sooner than those media objects associated with the lower rankings.

It will be appreciated that the hierarchy of rankings associated with the media objects may comprise a plurality of intermediate rankings between the lowest and highest rankings, for example, the hierarchy may include, a highest ranking and four lower rankings, or even more.

Regardless of the number of rankings used, when the mobile phone 10 is operating in "Smart" mode, the tracking function 50 is operable to change the ranking associated with the media objects from the highest ranking to a lower ranking, based upon predetermined criteria. For example, if the media object is randomly accessed by the random play function, the tracking function 50 will change the ranking associated with the media object to the second intermediate ranking. If the user then accesses less than half of the media object, such as, for example, less than half of an audio file, movie file, or image file, the tracking function 50 will change the ranking associated with the media object to the lowest ranking, because it will assume that the user does not like the playlist or is tired of the media object, perhaps from being played too often.

In the following example, the playlist contains five media objects, such as, for example, audio files: Song A, Song B, Song C, Song D, and Song E. The hierarchy of rankings includes six rankings, 1-6, wherein "1" designates the highest ranking and "6" designates the lowest ranking. If the song is randomly played and user listens to less than half of the audio file, then it is likely that the user does not like the song, therefore the ranking associated with the song will be changed by the tracking function 50 to the lowest ranking, or in this example to "6." If the song is randomly played and the user listens to half of the song or more, then the ranking is changed to a lower intermediate ranking, which in this example would be "4." If the user manually selects a song for play, it is likely that the user likes the song and therefore the ranking associated with the song will be changed to a higher intermediate ranking, or in this example "3." The "2" and the "5" rankings in this example are place holders, or buffers, so that songs can work their way up through the rankings and eventually have a higher priority than those songs whose ranking is changed to "3," "4," or "6." Further, it will be appreciated that a larger spread of rankings may be utilized, such as "1"-"10" to allow more place holders or buffers, thereby allowing the ranking to be more accurate by playing preferred songs more frequently than skipped songs In the following exemplary sequence, each song has just been added to the playlist 54. By default, each newly added song is automatically assigned the highest ranking, therefore the rankings associated with each song are as follows:

| Song | Ranking |
|---|---|
| Song A | 1 |
| Song B | 1 |
| Song C | 1 |
| Song D | 1 |
| Song E | 1 |

After being added to the playlist 54, each song is available to be randomly selected by the random selection function 48 for play by the media player 46. Assuming Song D is randomly selected by the random play function 48, Song D will be played and the ranking associated with Song D would be changed by the tracking function 50 from "1" to "4" as follows:

| Song | Ranking |
|---|---|
| Song A | 1 |
| Song B | 1 |
| Song C | 1 |
| Song D | 4 |
| Song E | 1 |

After Song D is played all the way through, the random play function 48 will randomly select another media object from the group of media objects associated with the highest ranking for play by the media player 46. Therefore, because songs associated with the highest ranking remain in the playlist, another will be randomly selected for play. Assuming that Song B is randomly selected for play, the tracking function 50 will operate to change the ranking associated with Song B from "1" to "4."

| Song | Ranking |
|---|---|
| Song A | 1 |
| Song B | 4 |
| Song C | 1 |
| Song D | 4 |
| Song E | 1 |

If the user uses the manual selection function 52 to select Song A for play before Song B has been played half way through, the tracking function 50 will operate to change the ranking associated Song B to the lowest ranking, or from "1" to "6." If Song A is then played in its entirety, or at least more than halfway through, the tracking function 50 will operate to change the ranking associated with Song A to "3" since it was manually selected. Thus, the new rankings would be as follows:

| Song | Ranking |
|---|---|
| Song A | 3 |
| Song B | 6 |
| Song C | 1 |
| Song D | 4 |
| Song E | 1 |

After song A is played, the random play section 48 would then randomly select another song from the group of songs associated with the highest ranking. In this example, the random play function 48 would randomly select Song C or Song E, since they are the only remaining songs associated with the highest ranking. Assuming Song E is then randomly selected for play, the ranking associated with Song E would be changed to "4."

| Song | Ranking |
|---|---|
| Song A | 3 |
| Song B | 6 |
| Song C | 1 |
| Song D | 4 |
| Song E | 4 |

If the user selects the next random song before Song E is played half way through, the tracking function 50 will change the ranking associated with Song E to "6," and the random play function 48 would then randomly select Song C for play because Song C is the only song remaining with the highest ranking. After being accessed, the tracking function 50 will change the ranking associated with Song C to "4."

If all of the media objects with the highest ranking have been randomly accessed by the random play function 48, or if all of the media objects are associated with a lower ranking, then the tracking function 50 raises or increases the ranking associated with each of the plurality of media files in the playlist 54 until at least one of the media objects is associated with the highest ranking. The media player 46 can then continue to randomly access and play the plurality of media objects associated with the highest ranking. Thus, after Song C is played more halfway, the new ranking would be:

| Song | Ranking |
|---|---|
| Song A | 3 |
| Song B | 6 |
| Song C | 4 |
| Song D | 4 |
| Song E | 6 |

Since no media objects are associated with the highest ranking, the tracking function 50 increases the ranking of each of the media objects until at least one of the media objects is associated with the highest ranking. Thus, the media objects associated "6" will be associated with a "5" and those with a "5" to a "4" and so on. After increasing the rankings once the new rankings would be:

| Song | Ranking |
|---|---|
| Song A | 2 |
| Song B | 5 |
| Song C | 3 |
| Song D | 3 |
| Song E | 5 |

Because the random play function 48 is operable to randomly access those media objects associated with the highest ranking, however, there would still not be any media objects to access. The tracking function 50 therefore would operate to increase the ranking of the media objects a second time. The new rankings would be as follows:

| Song | Ranking |
|---|---|
| Song A | 1 |
| Song B | 4 |
| Song C | 2 |
| Song D | 2 |
| Song E | 4 |

After the rankings are increased the second time, at least one media object is associated with the highest ranking. Therefore, the random play function 48 operates to randomly select a song associated with the highest ranking. In this example, Song A is then selected for play because it is the only song file associated with the highest ranking, however, immediately after Song A is selected for play, the user decides to skip the song. Thus, the new ranking would be as follows:

| Song | Ranking |
|---|---|
| Song A | 6 |
| Song B | 4 |
| Song C | 2 |
| Song D | 2 |
| Song E | 4 |

Because there are no songs associated with the highest ranking, the tracking function 50 operates to increase the rankings of each of the songs until at least one of the songs is associated with the highest ranking, which in this example would be one iteration. The new rankings would be:

| Song | Ranking |
|---|---|
| Song A | 5 |
| Song B | 3 |
| Song C | 1 |
| Song D | 1 |
| Song E | 3 |

The random play function 48 could then operate to randomly select Song A or Song C, since those are the only two songs associated with the highest ranking. The user, however, adds Song F, a new song, to the playlist 54. By default, Song F would immediately be associated with the highest ranking, and would be eligible for random selection by the random play function 48. The new rankings would be as follows:

| Song | Ranking |
|---|---|
| Song A | 5 |
| Song B | 3 |
| Song C | 1 |
| Song D | 1 |
| Song E | 3 |
| Song F | 1 |

The random play function 48 would then operate to randomly select Song C, Song D, or Song F for play by the media player 46, since they would be the only songs associated with the highest ranking. The process of changing and increasing the rankings with the random play function 48 and the tracking function 50 would continue as described herein.

Figure 4:
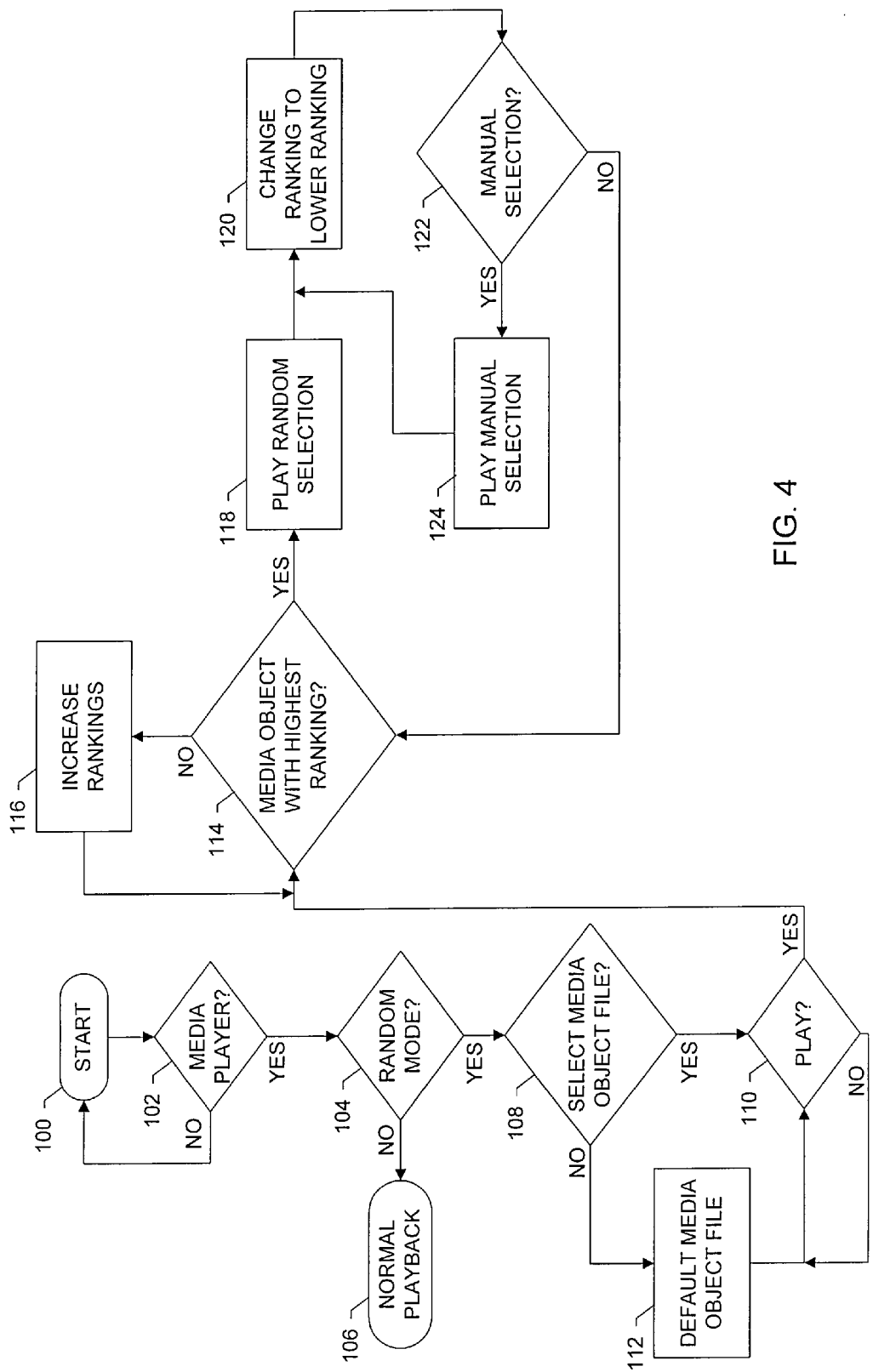
FIG. 4 is a flowchart representing the relevant operation of the electronic equipment of FIG. 1.

Referring now to FIG. 4, a flowchart illustrates the operation of the mobile phone 10 with respect to the random function and tracking function 50. Operation begins in Step 100 where the mobile phone 10 has been turned on, e.g., via the power on/off key 28 (FIG. 1). Next, in Step 102 the control circuit 40 determines if the mobile phone 10 is in media player mode. The mobile phone 10 may have been placed in the media player mode as a result of user selection via the navigation keys and display, or any other predesignated manner as will be appreciated. If the mobile phone 10 has not been placed in the media player mode, the mobile phone 10 will continue to loop through Step 102 as shown in FIG. 4.

If the mobile phone 10 is in the media player mode as determined in Step 102, the mobile phone 10 proceeds to Step 104. In Step 104, the control circuit 40 determines if the mobile phone 10 has been placed in random mode as described herein. The mobile phone 10 may have been placed in the random mode in the manner described above, or any other manner as will be appreciated. In the event the random mode has not been selected as determined in Step 104, the mobile phone 10 proceeds to Step 106 and normal playback is carried out without the features described herein.

On the other hand, if the user selects random operation as determined in Step 104, the mobile phone 10 proceeds to Step 108. In Step 108, the control circuit 40 determines if the user has selected a playlist among the playlists 54 in the memory 44. The user may select the playlist 54 in any known manner, including via the navigation keys and display 14 as is typical. If the user has selected a playlist as determined in Step 108, the mobile phone 10 proceeds to Step 110. If the user has not selected a playlist as determined in Step 108, the mobile phone 10 proceeds to Step 112 where the control circuit 40 reverts to a default playlist as described herein, which may consist of all of the media objects in the media library. Thereafter, the mobile phone 10 proceeds to Step 110 as shown.

In Step 110, the control circuit 40 determines if the user has selected the play function of the media player 46, whereby the media player 46 is to begin playing the media objects in the playlist 54 from Step 108 or Step 112. The user may select the play function using any conventional technique, typically by pressing a corresponding key on the mobile phone 10. If the user has not selected the play function in Step 110, the control circuit 40 will simply loop around Step 110 as shown. On the other hand, upon the user selecting the play function, the mobile phone 10 proceeds from Step 110 to Step 114.

In Step 114, the control circuit 40 determines if any media objects in the playlist 54 are associated with the highest ranking. If there are no media objects in the playlist 54 with the highest ranking, the tracking function 50 will increase the ranking associated with each of the media objects in Step 116.

The control circuit 40 will then determine if at least one media object has the highest ranking by looping Step 114 and Step 116 until at least one media object has the highest ranking.

On the other hand, if the control circuit 40 determines that at least one media object has the highest ranking, the mobile phone 10 will perform Step 118. In Step 118, the random play function 48 accesses a random media object from the group of media objects associated with the highest ranking and the media object is played by the media player 46. After being accessed by the random play function 48, the mobile phone 10 will proceed to Step 120, where the tracking function 50 changes the ranking associated with the media object. The ranking associated with the media object will be lowered according to certain criteria, as described above. For example, if the media object is accessed by the random play function 48 and less than half of the media object is played by the media player 46, the tracking section 50 will change ranking associated with the media object to a lower ranking. If the media object is played more than half way through, the tracking function 50 will change the ranking associated with the media object by lowering the ranking to a different lower ranking, but one that is higher than the ranking of the media object that is played less than halfway through.

After changing the ranking associated with the most recently played media object, the mobile phone 10 with proceed to Step 122. In Step 122, the control circuit 40 will check to see if a manual selection via the manual selection function 52 has been made by the user. If a manual selection has been made, the media player 46 will play the selected media object in Step 124 and then proceed back to Step 120 where the tracking section 50 will change the ranking associated with the manually selected media objects to a lower ranking that may be the same as or higher than the lower ranking associated with media objects that have been randomly accessed and played more than half way through.

After Step 120, the control circuit 40 will repeat Step 122, and, if a manual selection has been made, the control circuit 40 repeats Steps 124 and 120. If a manual selection has not been made, the control circuit repeats Step 114, i.e., will determine whether at least one media object is associated with the highest ranking. Further, in the event that a manual selection is not made, the control circuit 40 will loop to Step 114 to determine if a media object has a highest ranking.

The mobile phone 10 will continue to loop through Steps 114-124 until the mobile phone 10 is turned off, or until the user starts the program over by selecting a new playlist 54 to randomly play, or if the user closes the media player 46.

The particular types of rankings described above can be any type of rankings. The above description provides examples of different types, but the present invention is not intended to be limited to only those examples described herein. The present invention includes any number of rankings. All that is needed is to provide an appropriate ranking scheme and criteria for changing the rankings as will be readily appreciated by those having ordinary skill in the art based on the disclosure herein. Still further, it will be appreciated that the electronic equipment can be programmed such that the random play function randomly selects a media object with a ranking other than the highest ranking.

In view of the above description, it will be appreciated that the present invention provides for electronic equipment with media playback as described herein that do not suffer from the drawbacks of conventional media playback devices. More particularly, the electronic equipment described herein provides for electronic equipment that allows a user to engage a random feature that tracks the media objects played by the media object player and/or plays preferred media objects more frequently.

It should be appreciated that the term "playlist" as referred to herein represents a list of media objects intended for playback. The order in which the media objects appear in the list is indicative of the order in which the media objects are to be played. The playlist may be an actual entity (typically a digital file) within an electronic equipment. Alternatively, and particularly in the case of a default playlist in an electronic equipment, the playlist may be represented circumstantially based on the manner in which the media objects are normally reproduced. For example, the playlist may represent the media objects and the order the electronic equipment would reproduce the media objects during conventional operation. More specifically, an electronic equipment may simply begin playing media objects one after another starting at a beginning address of a recording medium and the media object stored thereat (e.g., the first track of a CD) and proceeding sequentially through the media objects in the order they are stored in the recording medium (e.g., tracks 2, 3, 4, etc. of a CD). As another alternative, a playlist may be represented by a table of contents of a storage medium stored as part of data management information in the electronic equipment. A "playlist," in the context of the present invention, refers to the media objects that would normally be reproduced by the electronic equipment, and the order in which the media objects would normally be played, if a random feature was not activated.

Although the result of a random operation within a playlist is represented herein predominantly with physical changes by a change in the displayed ranking and/or content of the playlist, those having ordinary skill in the art will appreciate that a playlist itself need not necessarily be altered. For example, the electronic equipment may be designed to use a pointer to point to the address of a particular media object within the playlist to be played. In normal sequential playback, the pointer simply points to the address of the next media object in the sequence of the playlist. In random mode, on the other hand, a random or pseudo-random generator is used to cause the pointer to move randomly to a next media object with a highest ranking in the playlist to be played. The present invention is intended to cover any and all such types of shuffle operation. The change in the displayed order of the playlist as illustrated herein is simply intended to facilitate ease of understanding.

Still further, while the objects with respect to media players 46 are described above primarily as media objects in the form of audio files, video files, image files, etc., the objects of the random operation may be other media related objects. For example, a playlist 54 may be made up of objects whereby the objects themselves represent individual playlists. By implementing the random operation described herein, the mobile phone 10 may randomly play each of the playlists.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:
1. An electronic equipment comprising:
 a playlist with a plurality of media objects, each associated with a ranking from a hierarchy of rankings, wherein the hierarchy of rankings comprises a highest ranking and at least one lower ranking;

a media player section configured to play the plurality of media objects, the media player section comprising:
a random play function operable to randomly access media objects associated with the highest ranking from the playlist in order to be played by the media player section; and
a tracking function to lower the ranking associated with the randomly accessed media objects from the highest ranking to a lower ranking after the media objects have been randomly accessed, and for raising the ranking associated with each of the plurality of the media objects until at least one media object is associated with the highest ranking in the event that each of the plurality of media objects is associated with a lower ranking.

2. The electronic equipment of claim 1, wherein the at least one lower ranking comprises an intermediate ranking and a lowest ranking, wherein the intermediate ranking is between the highest ranking and the lowest ranking.

3. The electronic equipment of claim 2, wherein the tracking function changes the ranking associated with the randomly accessed media objects to the intermediate ranking after the media object has been accessed by the random play function.

4. The electronic equipment of claim 3, wherein the tracking function changes the ranking associated with the randomly accessed media objects to the lowest ranking in the event that the media player plays less than half of the media object.

5. The electronic equipment of claim 4, further comprising a manual selection function to manually access media objects from the playlist in order to be played by the media player.

6. The electronic equipment of claim 5, wherein the tracking function changes the ranking associated with the manually accessed media objects to the intermediate ranking after the media objects have been accessed by the manual selection section.

7. The electronic equipment of claim 1, wherein the at least one lower ranking comprises a plurality of intermediate rankings and a lowest ranking, wherein the plurality of intermediate rankings is between the highest ranking and the lowest ranking.

8. The electronic equipment of claim 7, wherein the plurality of intermediate rankings includes a first intermediate ranking and a second intermediate ranking, wherein the first intermediate ranking is higher than the second intermediate ranking and the second intermediate ranking is higher than the lowest ranking.

9. The electronic equipment of claim 8, further comprising a manual selection function to manually access media objects from the playlist in order to be played by the media player section.

10. The electronic equipment of claim 9, wherein the tracking function changes the ranking associated with the manually accessed media objects to the first intermediate ranking after the media objects have been manually accessed by the manual selection section.

11. The electronic equipment of claim 8, wherein the tracking function changes the ranking associated with randomly accessed media objects to the second intermediate ranking in the event that the media objects have been accessed by the random play function for play by the media player.

12. The electronic equipment of claim 11, wherein the tracking function changes the ranking associated with the randomly accessed media objects to the lowest ranking in the event that the media player plays less than half of the media object.

13. The electronic equipment of claim 12, further comprising a manual selection function to manually access media objects from the playlist in order to be played by the media player section and wherein the tracking function changes the ranking associated with the manually accessed media objects to the first intermediate ranking after the media objects have been manually accessed by the manual selection section.

14. The electronic equipment of claim 13, wherein the plurality of intermediate rankings further comprises a third intermediate ranking between the first intermediate ranking and the second intermediate ranking and a fourth intermediate ranking between the second intermediate ranking and the lowest intermediate ranking.

15. The electronic equipment of claim 14, wherein the plurality of intermediate rankings further comprises a plurality of additional rankings between the first intermediate ranking and the second intermediate ranking and a plurality of additional rankings between the second intermediate ranking and the lowest intermediate ranking.

16. The electronic equipment of claim 1, wherein the media objects comprise at least audio files.

17. The electronic equipment of claim 1, wherein the media objects comprise at least video files.

18. The electronic equipment of claim 1, wherein the media objects comprise at least image files.

19. The electronic equipment of claim 1, wherein the electronic equipment is a mobile phone.

20. The electronic equipment of claim 1, wherein the electronic equipment is a personal entertainment device.

21. The electronic apparatus of claim 1, wherein at least one of the playlist or media objects is located remote from the electronic equipment.

22. A method of playing media objects on an electronic equipment comprising a media player section including a random play function and a tracking function, the method comprising the steps of:
(i) the media player section accessing a plurality of media objects in a media file, each associated with a ranking from a hierarchy of rankings, wherein the hierarchy of rankings comprising a highest ranking and at least one lower ranking;
(ii) the random play function randomly accessing and playing media objects associated with the highest ranking from among the plurality of media objects in order to be played;
(iii) the tracking function changing the ranking associated with the randomly accessed media objects from the highest ranking to a lower ranking; and
(iv) the tracking function increasing the ranking associated with each of the plurality of media objects in the event that each of the plurality of media objects is associated with a lower ranking until at least one media object is associated with the highest ranking.

23. The method of claim 22, wherein the at least one lower ranking comprises at least one intermediate ranking and a lowest ranking.

24. The method of claim 23, wherein the ranking associated with the media objects is changed from the highest ranking to the intermediate ranking in the event that the media objects have been played.

25. The method of claim 24, further comprising changing the ranking associated with the media objects from the intermediate ranking to the lowest ranking in the event that less than half of the media object is played.

26. The method of claim 24, the media player section further including a manual selection function configured to allow manual selection of media objects, the method further comprising the manual selection function manually selecting media objects to be played from among the plurality of media objects in the playlist, and the tracking function changing the ranking associated with the manually selected media objects to the intermediate ranking after the manually selected media object is accessed.

27. The method of claim 23, wherein the at least one intermediate ranking comprises a first intermediate ranking and a second intermediate ranking, wherein the first intermediate ranking is between the highest ranking and the second intermediate ranking and the second intermediate ranking in between the first intermediate ranking and the lowest ranking.

28. The method of claim 27, wherein the ranking associated with the media objects is changed to the second intermediate ranking in the event that the media objects are randomly accessed and played.

29. The method of claim 28, wherein the ranking associated with the media objects is changed to the lowest ranking in the event that less than half of the randomly accessed media object is played.

30. The method of claim 29, further comprising the step of manually selecting a media object from among the plurality of media objects in order to be played, wherein the ranking associated with the manually selected media object is changed to the first intermediate ranking after the media object is manually accessed.

31. A program stored on a non-transitory machine readable medium which, when executed by a machine, provides for reproducing media objects in an electronic equipment by:
   providing a playlist, the content of which identifies a plurality of media objects associated with a ranking from a plurality of rankings, wherein the plurality of rankings includes a highest ranking and at least one lower ranking;
   randomly accessing and playing the media objects associated with the highest ranking;
   changing the ranking associated with the media objects to a lower ranking after the media objects has been played; and
   increasing the ranking associated with each of the plurality of media objects in the event that none of the media objects are associated with the highest ranking.

\* \* \* \* \*